(12) United States Patent
Zhou

(10) Patent No.: US 12,451,794 B2
(45) Date of Patent: Oct. 21, 2025

(54) HYBRID MODULAR MULTI-LEVEL CONVERTER (HMMC) AND MODULAR MULTI-LEVEL CONVERTER (MMC)

(71) Applicant: GE ENERGY POWER CONVERSION TECHNOLOGY LIMITED, Warwicksire (GB)

(72) Inventor: Zhi Zhou, Bethlehem, NY (US)

(73) Assignee: GE ENERGY POWER CONVERSION TECHNOLOGY LIMITED, Warwickshire (GB)

( * ) Notice: Subject to any disclaimer, the term of this patent is extended or adjusted under 35 U.S.C. 154(b) by 447 days.

(21) Appl. No.: 18/167,727

(22) Filed: Feb. 10, 2023

(65) Prior Publication Data

US 2024/0275263 A1     Aug. 15, 2024

(51) Int. Cl.
*H02M 1/00*     (2007.01)
*H02M 7/483*     (2007.01)

(52) U.S. Cl.
CPC ......... *H02M 1/0095* (2021.05); *H02M 1/007* (2021.05); *H02M 7/483* (2013.01)

(58) Field of Classification Search
CPC .......................... H02M 1/0095; H02M 7/483
See application file for complete search history.

(56) References Cited

U.S. PATENT DOCUMENTS

| | | | |
|---|---|---|---|
| 9,515,568 B2 | 12/2016 | Zhang et al. | |
| 10,075,056 B2 | 9/2018 | Zhang et al. | |
| 11,075,587 B2* | 7/2021 | Oh | H02J 3/36 |
| 2015/0124506 A1* | 5/2015 | Sahoo | H02P 27/14 |
| | | | 363/126 |
| 2016/0268915 A1* | 9/2016 | Lin | H02M 7/483 |

* cited by examiner

*Primary Examiner* — Gary A Nash
(74) *Attorney, Agent, or Firm* — Wood IP, LLC; Theodore A. Wood

(57) ABSTRACT

Provided are modular multilevel converter and hybrid modular multilevel converters. Each of the modular multilevel converters and hybrid modular multilevel converters include submodules. Each submodule includes a first half bridge converter, a second half bridge converter, and a dual active bridge converter having a first connection, a second connection, a third connection and a fourth connection. The first half bridge converter is interconnected with the first and second connections via a first capacitor included in the first half bridge and the second half bridge converter is interconnected with the third and fourth connections via a second capacitor included in the second half bridge.

24 Claims, 13 Drawing Sheets

703

HYBRID MODULAR MULTI-LEVEL CONVERTER (HMMC) AND MODULAR MULTI-LEVEL CONVERTER (MMC)

FIELD OF TECHNOLOGY

The following disclosure relates generally to modular multilevel converters (MMCs).

BACKGROUND

Hybrid modular multi-level converters (HMMCs) or modular multi-level converters (MMCs) comprise submodules (SMs) and switches.

However, the HMMCs and traditional MMCs do not have built-in galvanic isolation in themselves.

HMMCs or MMCs may be used for transformerless applications.

To provide galvanic isolation, it is known to add an external standard stand-alone conventional fundamental frequency transformer to provide the required galvanic isolation.

One disadvantage, however, is that the addition of such a transformer tends to be large in size and heavy in weight, and therefore has a lower power density of an overall power system comprising an HMMC or MMC and such a transformer.

For stationary utility or electric power grid applications, the larger volume and heavier weight may not be problematic. However, for motive applications (e.g., marine propulsion), volume, weight, and power density are critical requirements in addition to the cost.

SUMMARY OF THE EMBODIMENTS

Given the foregoing deficiencies, systems and methods are needed for an MMC or HMMC for reducing footprint/volume, weight, and costs compared with traditional galvanic isolated MMC or HMMC solutions. Such methods and systems should maintain the modularity, scalability, and power quality performance of the HMMC and the MMC.

In certain circumstances, an embodiment includes a modular multilevel converter (MMC) having an ABC N-phase structure.

The MMC comprises N pairs of identical upper and lower arms, each upper and lower arm being composed of X submodules.

Each submodule comprises a first half bridge converter, a second half bridge converter, and a dual active bridge converter including a first connection, a second connection, a third connection and a fourth connection.

The first half bridge converter is interconnected with the first and second connections via a first capacitor included in the first half bridge and the second half bridge converter is interconnected with the third and fourth connections via a second capacitor included in the second half bridge.

Another embodiment includes a hybrid modular multi-level converter (HMMC) based on a neutral point clamped topology (NPC) or an active neutral point clamped topology (ANPC) and having an ABC N-phase structure.

The HMMC comprises N pairs of identical upper and lower arms, each upper and lower arm being composed of X submodules and Y sets of switches.

Each submodule comprises a first half bridge converter, a second half bridge converter, and a dual active bridge converter including a first connection, a second connection, a third connection and a fourth connection.

The first half bridge converter is interconnected with the first and second connections via a first capacitor included in the first half bridge and the second half bridge converter is interconnected with the third and fourth connections via a second capacitor included in the second half bridge.

Another embodiment includes a hybrid modular multi-level converter (HMMC) based on a neutral point pilot topology (NPP) and having an ABC N-phase structure.

The HMMC comprises N pairs of identical upper and lower arms, each upper and lower arm being composed of X submodules and Y sets of switches.

Each submodule comprises a first half bridge converter, a second half bridge converter, and a dual active bridge converter including a first connection, a second connection, a third connection and a fourth connection.

The first half bridge converter is interconnected with the first and second connections via a first capacitor included in the first half bridge and the second half bridge converter is interconnected with the third and fourth connections via a second capacitor included in the second half bridge.

The embodiments overcome the challenges associated with larger volume, heavier weight and higher costs with HMMC or MMC associated with external standard stand-alone conventional fundamental frequency transformers to provide the required galvanic isolation.

Additional features, modes of operations, advantages, and other aspects of various embodiments are described below with reference to the accompanying drawings. It is noted that the present disclosure is not limited to the specific embodiments described herein. These embodiments are presented for illustrative purposes only. Additional embodiments, or modifications of the embodiments disclosed, will be readily apparent to persons skilled in the relevant art(s) based on the teachings provided.

BRIEF DESCRIPTION OF THE DRAWINGS

Illustrative embodiments may take form in various components and arrangements of components. Illustrative embodiments are shown in the accompanying drawings, throughout which like reference numerals may indicate corresponding or similar parts in the various drawings. The drawings are only for purposes of illustrating the embodiments and are not to be construed as limiting the disclosure. Given the following enabling description of the drawings, the novel aspects of the present disclosure should become evident to a person of ordinary skill in the relevant art(s).

DETAILED DESCRIPTION

While the illustrative embodiments are described herein for particular applications, it should be understood that the present disclosure is not limited thereto. Those skilled in the art and with access to the teachings provided herein will recognize additional applications, modifications, and embodiments within the scope thereof and additional fields in which the present disclosure would be of significant utility.

Figure 1:
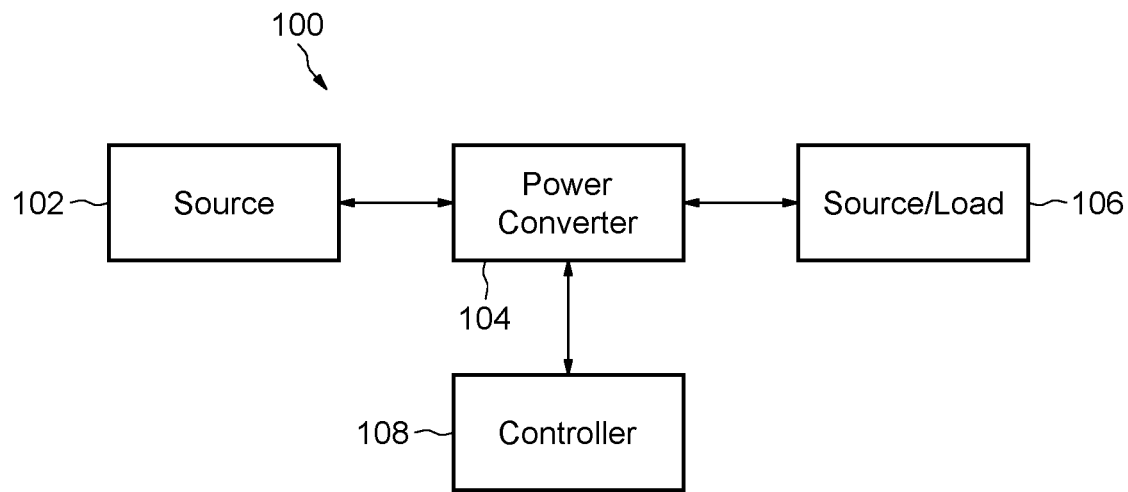
FIG. 1 illustrates a block diagram of an exemplary system for performing power conversion in accordance with embodiments of the present disclosure.

FIG. 1 includes a system 100 for converting power. In one embodiment, the system 100 includes a source 102, a power converter 104, and a source/load 106. The term source, as used herein, refers to a renewable power source, a non-renewable power source, a generator, a grid, a fuel cell, an energy storage (when discharged), and the like. Also, the term load, as used herein, may refer to a motor, an electrical appliance, an energy storage (when re-charged) and the like.

In addition, the power converter 104 may be a multilevel converter. In one embodiment, the source 102 may be operatively coupled to a first terminal (not shown) of the power converter 104. A second terminal (not shown) of the power converter 104 may be operatively coupled to the source/load 106. The first terminal and the second terminal may be alternatively employed as an input terminal or an output terminal of the power converter 104.

The system 100 further includes a controller 108. The controller 108 is configured to control the operation of the power converter 104, the embodiments. By way of example only, and not limitation, the controller 108 may be configured to control the operation of the power converter 104 by controlling switching of a plurality of semiconductor switches and submodules (SMs) within the power converter 104.

By way of background, and as noted above, 2-level converters are a fundamental component of MMCs.

Figure 2:
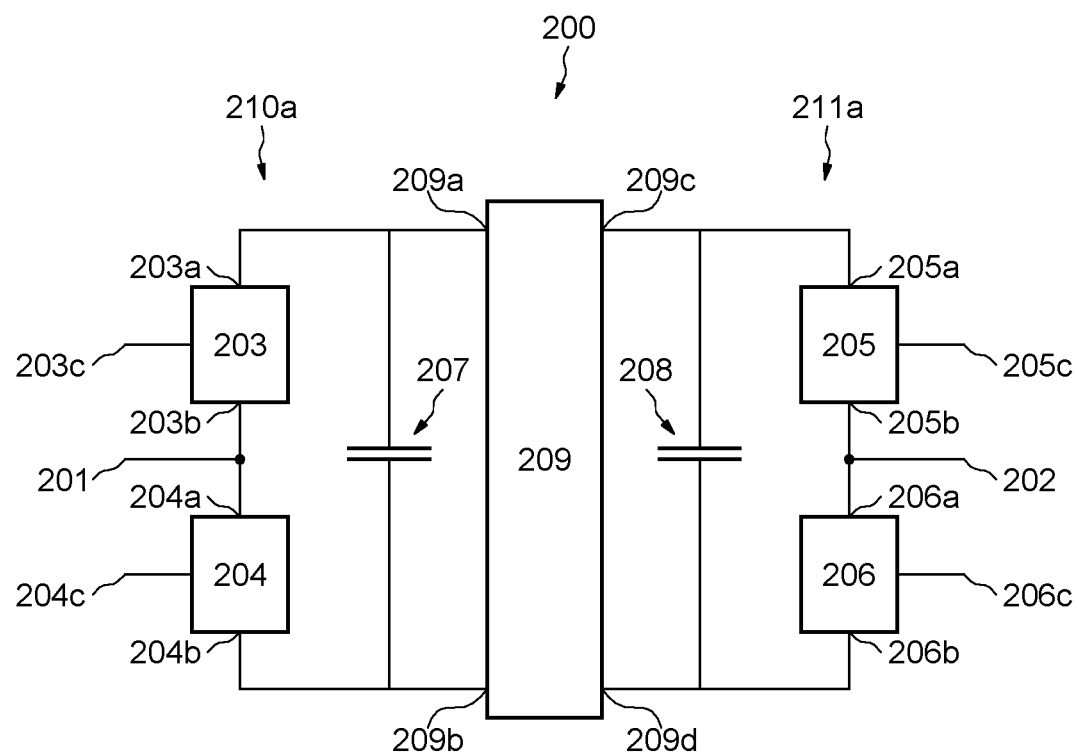
FIG. 2 illustrates a block diagram of an exemplary SM in accordance with the embodiments.

FIG. 2 is a block diagram of an exemplary SM 200 in accordance with the embodiments. The exemplary SM 200 of FIG. 2 includes two terminals 201, 202, semiconductor switches 203, 204, 205, 206, two smoothing capacitors 207, 208, and a dual active bridge converter 209.

Each semiconductor switch 203, 204, 205, 206 includes a first connection 203a, 204a, 205a, 206a, a second connection 203b, 204b, 205b, 206b, and a third connection 203c, 204c, 205c, 206c.

The dual active bridge converter 209 comprises a first connection 209a, a second connection 209b, a third connection 209c and a fourth connection 209d.

The first connection 203a of the first semiconductor switch 203 is connected to a first end of a first smoothing capacitor 207 and to the first connection 209a of the dual active bridge converter 209.

The second connection 203b of the first semiconductor switch 203 and the first connection 204a of the second semiconductor switch 204 are connected to a first terminal 201 of the SM 200.

The second connection 204b of the second semiconductor switch 204 is connected to the second end of a first smoothing capacitor 207 and to the second connection 209b of the dual active bridge converter 209.

The first semiconductor switch 203, the second semiconductor switch 204, and the first smoothing capacitor 207 form a first half bridge converter 210a.

The first connection 205a of the third semiconductor switch 205 is connected to a first end of the second smoothing capacitor 208 and to the third connection 209c of the dual active bridge converter 209.

The second connection 205b of the third semiconductor switch 205 and the first connection 206a of the fourth semiconductor switch 206 are connected to the second terminal 202 of the SM 200.

The second connection 206b of the fourth semiconductor switch 206 is connected to the second end of the second smoothing capacitor 208 and to the fourth connection 209d of the dual active bridge converter 209.

The third semiconductor switch 205, the fourth semiconductor switch 206, and the second smoothing capacitor 208 form a second half bridge converter 211a.

The third connection 203c, 204c, 205c, 206c of the semiconductor switch 203, 204, 205, 206 is connected to the controller 108.

Figure 3A:
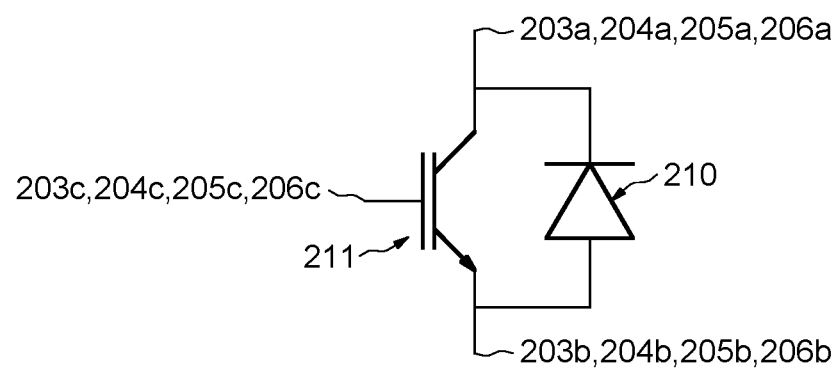
FIG. 3A illustrates a block diagram of exemplary hybrid semiconductor switches with silicon (Si) insulated gate bipolar transistors (IGBTs) in accordance with the embodiments.

FIG. 3A is a block diagram of an exemplary semiconductor switches 203, 204, 205, 206 based on silicon (Si) IGBT and a power diode.

Each semiconductor switch 203, 204, 205, 206 comprises a power diode 210 and an insulated gate bipolar transistor IGBT 211.

The drain of the transistor 211 and the cathode of the power diode 210 are connected to the first end 203a, 204a, 205a, 206a of the controllable switch 203, 204, 205, 206.

The source of the transistor 211 and the anode of the power diode 210 are connected to the second end 203b, 204b, 205b, 206b of the semiconductor switch 203, 204, 205, 206.

The gate of the transistor 211 is connected to the third connection 203c, 204c, 205c, 206c of the semiconductor switch 203, 204, 205, 206.

Figure 3B:
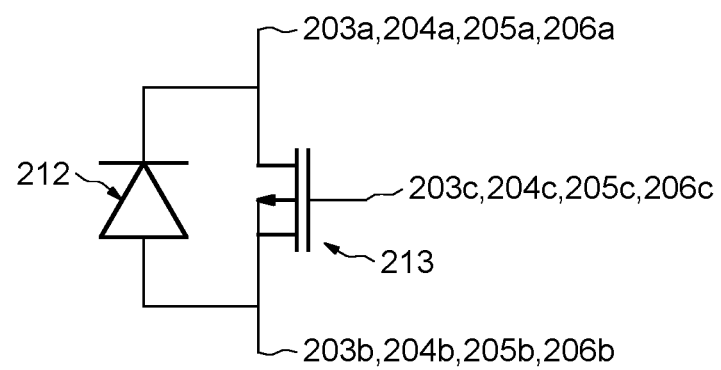
FIG. 3B illustrates a block diagram of exemplary hybrid semiconductor switches with silicon carbide (SiC) metal oxide semiconductor field effect transistors (MOSFETs) in accordance with the embodiments.

FIG. 3B is a block diagram of another exemplary semiconductor switches 203, 204, 205, 206 based on silicon carbide (SiC) MOSFET.

Each semiconductor switch 203, 204, 205, 206 comprises a power diode 212 and a SiC MOSFET 213.

The drain of the transistor 213 and the cathode of the power diode 212 are connected to the first end 203a, 204a, 205a, 206a of the controllable switch 203, 204, 205, 206.

The source of the transistor 213 and the anode of the power diode 212 are connected to the second end 203b, 204b, 205b, 206b of the semiconductor switch 203, 204, 205, 206.

The gate of the transistor 213 is connected to the third connection 203c, 204c, 205c, 206c of the semiconductor switch 203, 204, 205, 206.

In a variant, the semiconductor switches 203, 204, 205, 206 may be formed of field effect transistors (FETs), injection enhanced gate transistors (IEGTs), gallium nitride based switches, gallium arsenide based switches, or equivalents thereof.

Figure 3C:
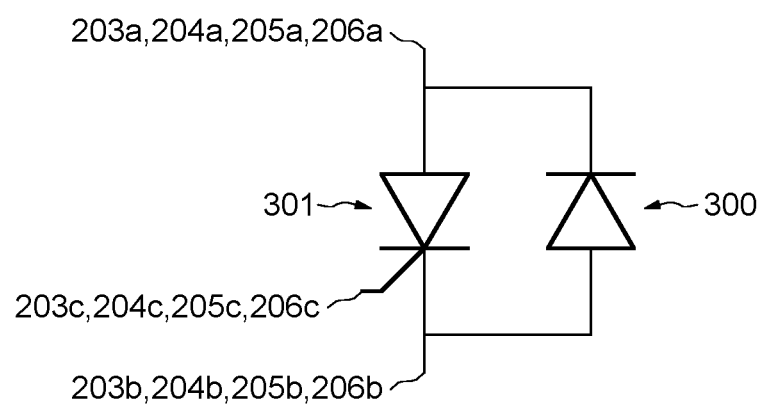
FIG. 3C illustrates a block diagram of exemplary hybrid semiconductor switches with silicon controlled rectifiers (SCRs) and antiparallel diodes in accordance with the embodiments.

FIG. 3C is a block diagram of another exemplary semiconductor switches 203, 204, 205, 206 with silicon controlled rectifiers (SCRs) and antiparallel diodes.

Each semiconductor switch 203, 204, 205, 206 comprises an antiparallel diode 300 and a silicon controlled rectifier 301.

The cathode of the antiparallel diode 300 and the anode of the silicon controlled rectifier 301 are connected to the first end 203a, 204a, 205a, 206a of the controllable switch 203, 204, 205, 206.

The anode of the antiparallel diode 300 and the cathode of the silicon controlled rectifier 301 are connected to the second end 203b, 204b, 205b, 206b of the semiconductor switch 203, 204, 205, 206.

The gate of the silicon controlled rectifier 301 is connected to the third connection 203c, 204c, 205c, 206c of the semiconductor switch 203, 204, 205, 206.

Figure 3D:
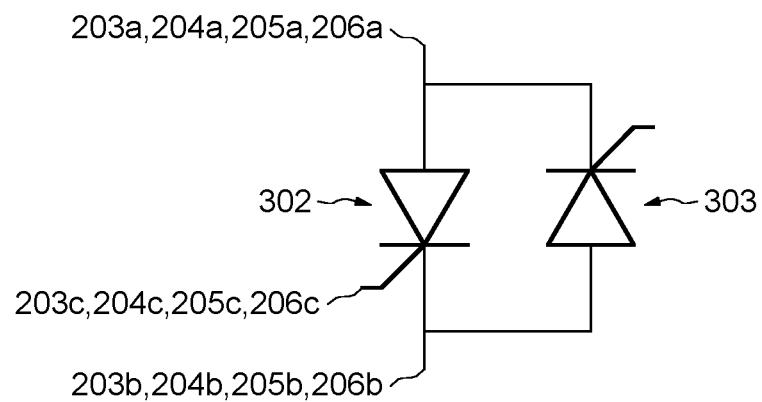
FIG. 3D illustrates a block diagram of exemplary hybrid semiconductor switches with silicon controlled rectifiers (SCRs) and antiparallel identical SCRs in accordance with the embodiments.

FIG. 3D is a block diagram of another exemplary hybrid semiconductor switches 203, 204, 205, 206 with silicon controlled rectifiers (SCRs) and antiparallel identical SCRs in accordance with the embodiments.

Each semiconductor switch 203, 204, 205, 206 comprises a silicon controlled rectifier 302 and an antiparallel silicon controlled rectifier 303 identical to the silicon controlled rectifier 302.

The anode of the silicon controlled rectifier 302 and the cathode of the antiparallel silicon controlled rectifier 303 are connected to the first end 203a, 204a, 205a, 206a of the controllable switch 203, 204, 205, 206

The cathode of the silicon controlled rectifier 302 and the anode of the antiparallel silicon controlled rectifier 303 are connected to the second end 203b, 204b, 205b, 206b of the controllable switch 203, 204, 205, 206.

The gate of the silicon controlled rectifier 302 is connected to the third connection 203c, 204c, 205c, 206c of the semiconductor switch 203, 204, 205, 206.

The gate of the antiparallel silicon controlled rectifier 303 is connected to the controller 108.

Figure 4:
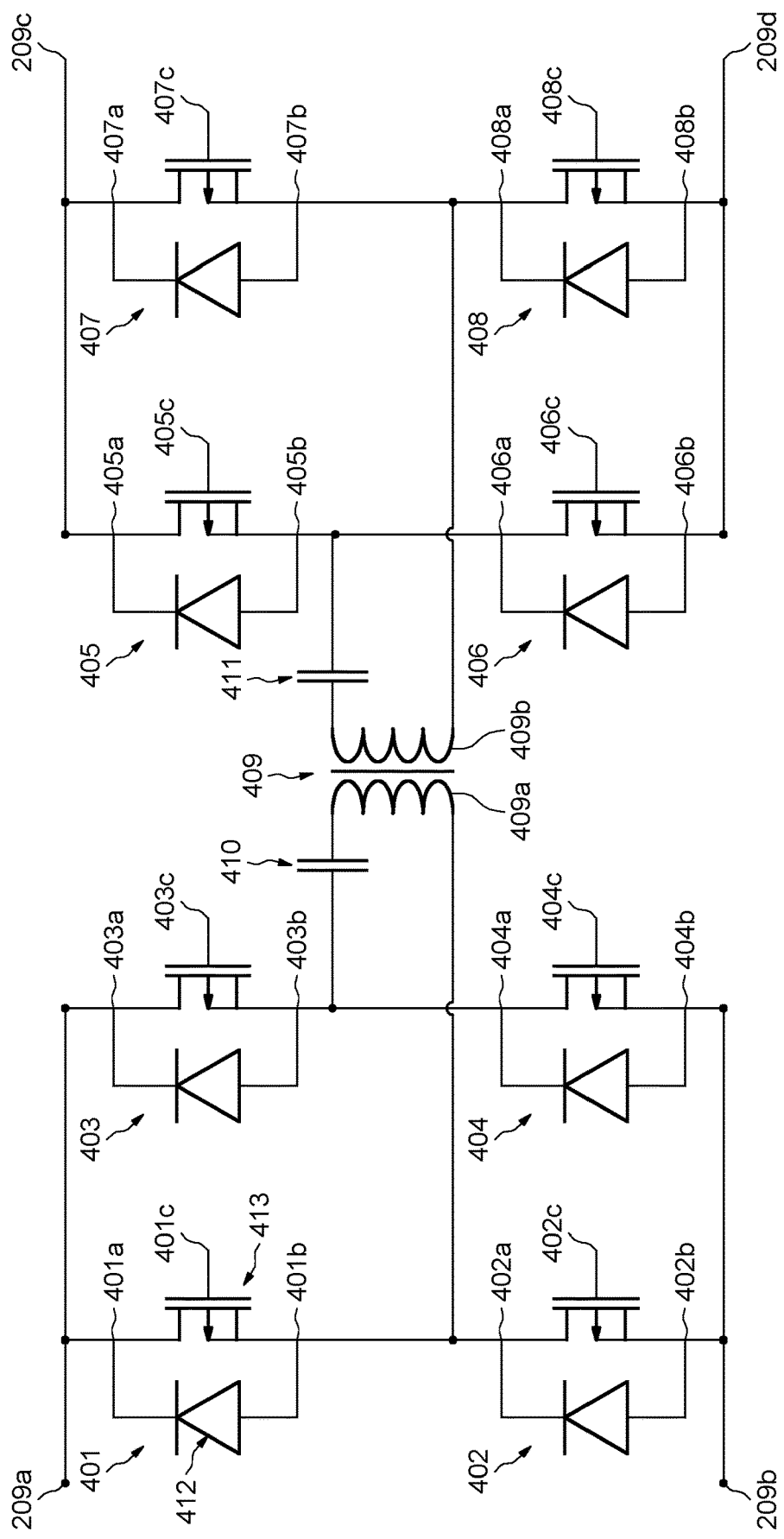
FIG. 4 illustrates a block diagram of an exemplary dual active bridge converter in accordance with the embodiments.

FIG. 4 is a block diagram of an exemplary dual active bridge converter 209.

The dual active bridge converter 209 comprises eight semiconductor switches 401, 402, 403, 404, 405, 406, 407, 408 and a high frequency transformer 409 comprising a primary circuit 409a and a secondary circuit 409b.

The first and second semiconductor switches 401, 402 form a first leg, the third and fourth semiconductor switches 403, 404 form a second leg, the fifth and sixth semiconductor switches 405, 406 form a third leg, and the seventh and eight semiconductor switches 407, 408 form a fourth leg.

The first and second legs extend between the first connection 209a and second connection 209b of the dual active bridge converter 209 and being connected to a different end of the primary circuit 409a.

The third and fourth legs extend between the third connection 209c and fourth connection 209d of the dual active bridge converter 209 and being connected to a different end of the secondary circuit 409b.

The dual active bridge converter 209 may further comprise two capacitors 410, 411.

Each semiconductor switch 401, 402, 403, 404, 405, 406, 407, 408 comprises a first connection 401a, 402a, 403a, 404a, 405a, 406a, 407a, 408a, a second connection 401b, 402b, 403b, 404b, 405b, 406b, 407b, 408b, a third connection 401c, 402c, 403c, 404c, 405c, 406c, 407c, 408c, a power diode 412, and a SiC MOSFET 413.

The drain of the transistor 413 and the cathode of the power diode 412 are connected to the first end 401a, 402a, 403a, 404a, 405a, 406a, 407a, 408a of the controllable switch 401, 402, 403, 404, 405, 406, 407, 408.

The source of the transistor 413 and the anode of the power diode 412 are connected to the second end 401b, 402b, 403b, 404b, 405b, 406b, 407b, 408b of the semiconductor switch 401, 402, 403, 404, 405, 406, 407, 408.

The gate of the transistor 413 is connected to the third connection 401b, 402b, 403b, 404b, 405b, 406b, 407b, 408b of the semiconductor switch 401, 402, 403, 404, 405, 406, 407, 408.

In a variant, the semiconductor switches 401, 402, 403, 404, 405, 406, 407, 408 may be formed of field effect transistors (FETs), injection enhanced gate transistors (IEGTs), gallium nitride-based switches, gallium arsenide-based switches, or equivalents thereof.

The first end 401a, 403a of the first and third semiconductor switches 401, 403 are connected to the first connection 209a of the dual active bridge converter 209.

The second end 402a, 404a of the second and fourth semiconductor switches 402, 404 are connected to the second connection 209b of the dual active bridge converter 209.

The second end 401b of the first semiconductor switch 401 and the first end 402a of the second semiconductor switch 402 are connected to a first end of the primary circuit 409a.

The second end 403b of the third semiconductor switch 403 and the first end 404a of the fourth semiconductor switch 404 are connected to the second end of the primary circuit 409a through a first capacitor 410.

The first end 405a, 407a of the fifth and seventh semiconductor switches 405, 407 are connected to the third connection 209c of the dual active bridge converter 209.

The second end 406b, 408b of the sixth and eight semiconductor switches 406, 408 are connected to the fourth connection 209d of the dual active bridge converter 209.

The second end 407b of the seventh semiconductor switch 407 and the first end 408a of the eight semiconductor switches 408 are connected to a first end of the secondary circuit 409b.

The second end 405b of the fifth semiconductor switch 405 and the first end 406a of the sixth semiconductor switch 406 are connected to the second end of the secondary circuit 409b through the second capacitor 411.

Each submodule comprises the dual active bridge converter 209 so that the said submodule is equipped with galvanic isolation functionality.

As represented in the following, the said submodules may be implemented in MMCs, (A)NPC-based and NPP-based HMMCs.

Various combinations of the SMs depicted in FIGS. 2-4 can be connected in series to produce any desirable number of conversion levels in a conventional MMC.

Figure 5:
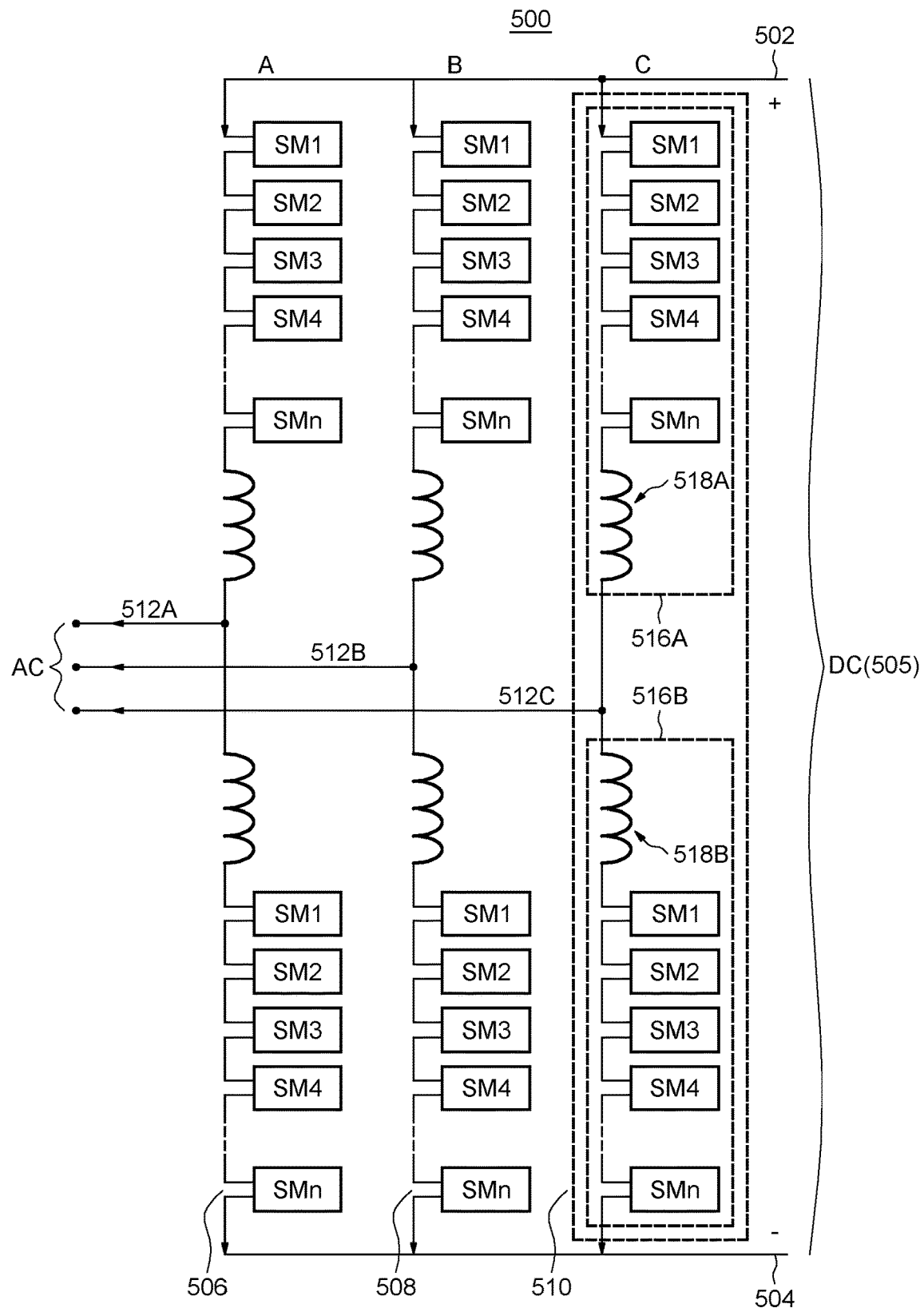
FIG. 5 illustrates a block diagram of a 2-level MMC.

FIG. 5 is a block diagram of an MMC 500, as described, using a plurality of SMs 200 connected in series.

In FIG. 5, the MMC 500 has an ABC 3-phase structure including positive and negative DC voltage rails 502 and 504, respectively. The positive and negative rails 502 and 504 form DC terminals 505. Each of the 3-phases (A, B, and C) corresponds to one of phase legs 506, 508, and 510. The phase legs 506, 508, and 510 are connected to AC terminals 512A, 512B, and 512C, respectively.

By way of example, the phase leg 510 includes an upper arm 516A and an identical lower arm 516B. In the example of FIG. 5, the upper and lower arms (516A and 516B) are connected together at one lead to the AC terminal 512C, and respectively include arm inductors 518A and 518B for current suppression. The upper and lower arms 516A and 516B are connected, at opposing leads, to the positive and negative rails 502 and 504, respectively.

The discussion regarding the phase leg 510 equally applies to the phase legs 506 and 508. The upper and lower arms of each phase leg 506, 508, and 510 include serially connected 2-level submodules SM1-SMn. Each of the 2-level submodules SM1-SMn is a submodule 200 illustrated in FIG. 2.

The MMC 500 converter comprising submodules with built-in galvanic isolation using dual active bridge converters 209 has a higher power density and is more compact than as a system including a stand-alone transformer and an MMC converter known from the prior art.

Further, the built-in galvanic isolation provides additional capability for fault-handling and protection which may be required for certain applications, such as military/Navy applications. The submodules with built-in galvanic isolation using dual active bridge converters 209 isolate the DC side comprising DC terminals 505 from the AC side comprising the AC terminals 512A, 512B, and 512C when a fault is detected on the DC side or on the AC side.

Figure 6A:
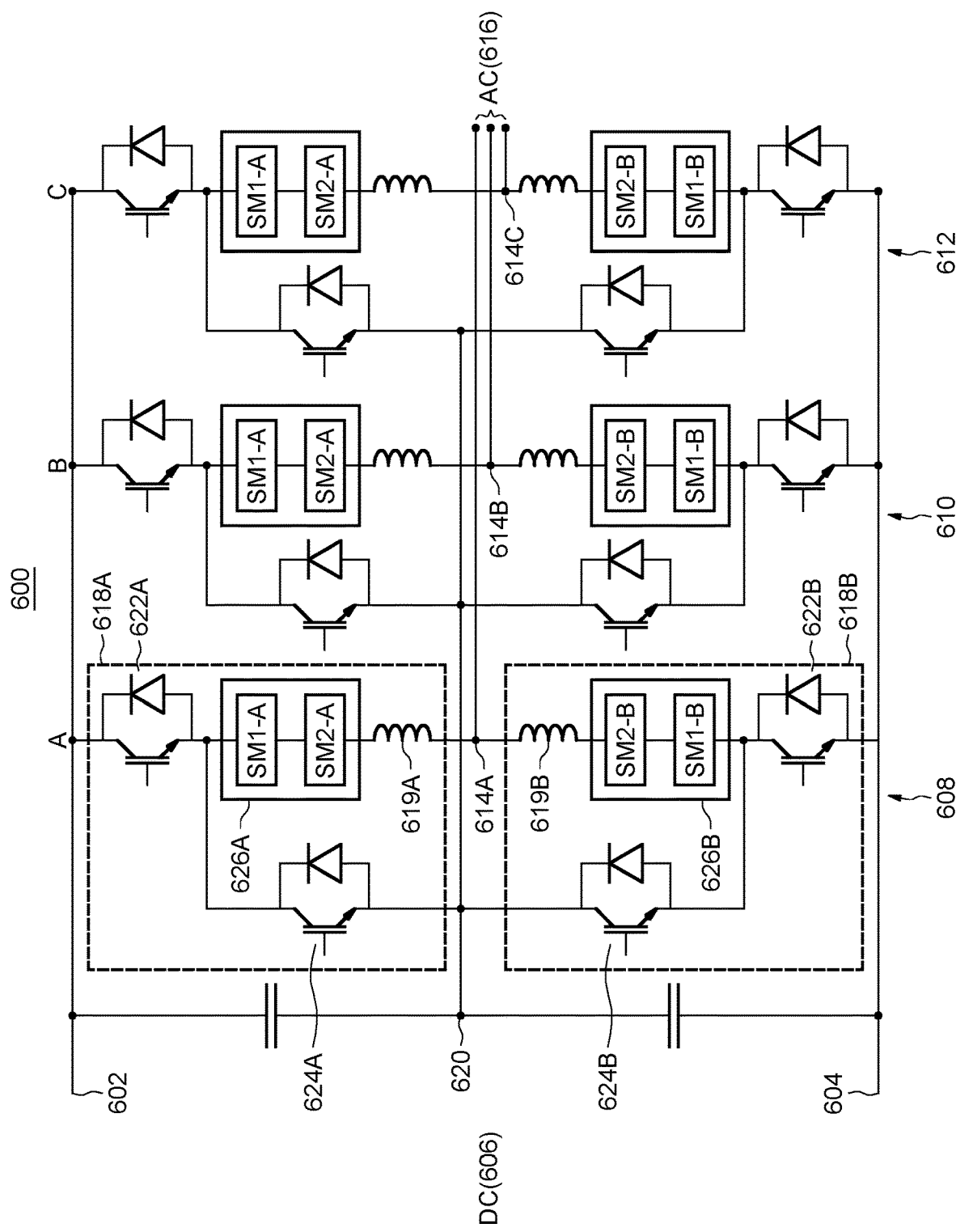
FIGS. 6A-6C illustrate block diagrams of a 3-level ANPC HMMC in accordance with various embodiments of the present disclosure.
Figure 6B:
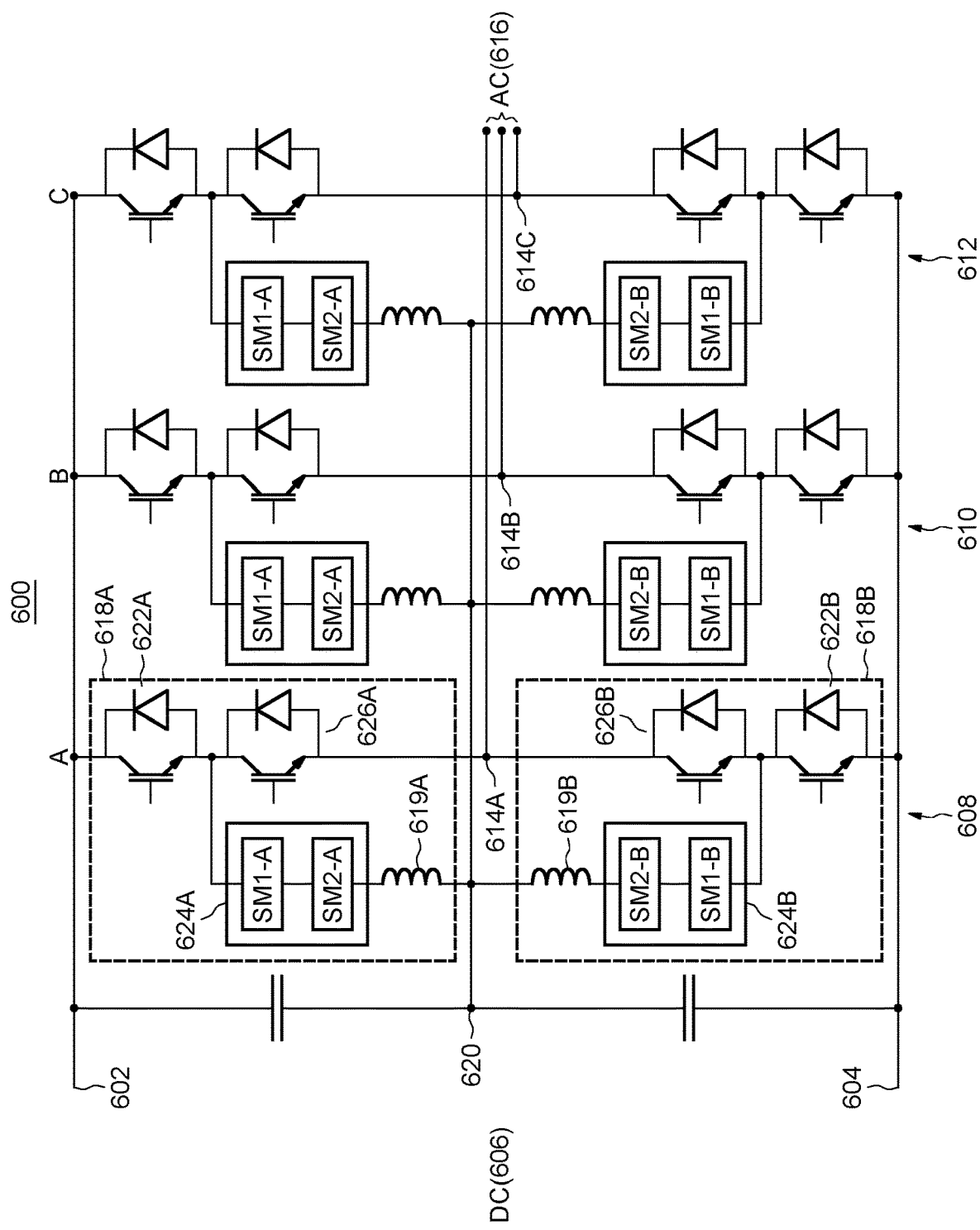
Figure 6C:
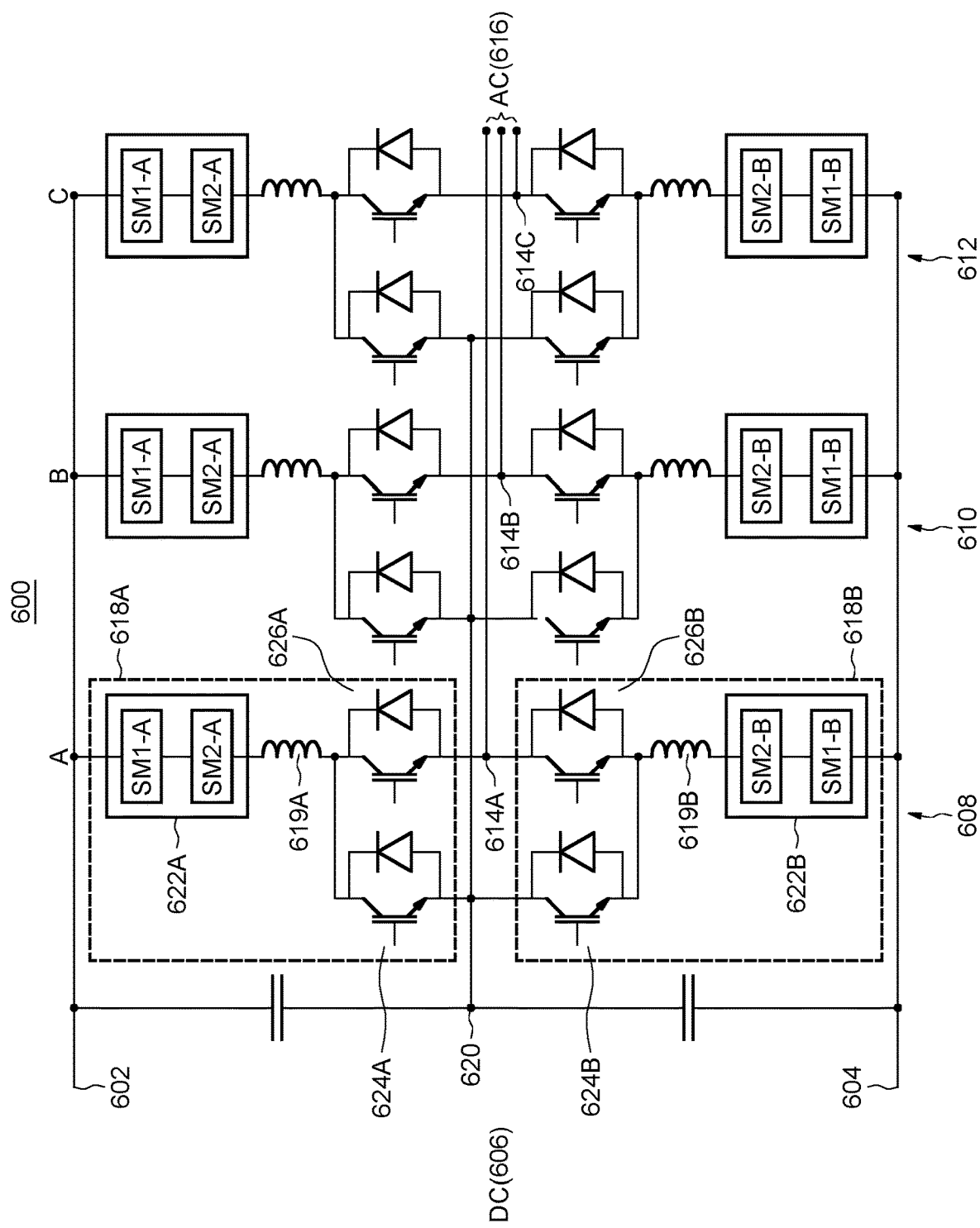

FIGS. 6A to 6C illustrates embodiments of a 3-level active neutral-point clamped (ANPC) converter 600 comprising the SM 200 also called HMMC based on an active neutral point clamped topology (ANPC).

The disclosed ANPC HMMC converters comprising submodules with built-in galvanic isolation using dual active bridge converters 209 has a higher power density and is more compact than as a system including a stand-alone transformer and an HMMC converter known from the prior art.

Further, the built-in galvanic isolation provides additional capability for fault-handling and protection which may be required for certain applications, such as military/Navy applications.

FIG. 6A is a block diagram of a first embodiment of the 3-level active neutral-point clamped (ANPC) converter 600, using a plurality of SMs 200 connected in series so that the first terminal 201 of an SM 200 is connected to the second terminal 202 of another adjacent SM 200.

The ANPC converter 600 includes an ABC 3-phase structure including positive and negative DC voltage rails 602 and 604, respectively. The positive and negative rails 602 and 604 form DC terminals 606. Each of the 3-phases (A, B, and C) includes a corresponding phase leg 608, 610, and 612. The phase legs 608, 610, and 612 are connected to AC terminals 614A, 614B, and 614C, respectively and form an AC side 616. The ANPC converter 600 includes a DC midpoint node 620.

The phase leg 608 includes upper and lower arms 618A and 618B, along with arm inductors 619A and 619B, respectively. By way of example, the upper arm 618A includes one switch 622A, and another switch 624A for actively controlling and connecting to the midpoint node 620. Also included is a third switch 626A. Being symmetrical to the upper arm 618A, the lower arm 618B includes switches 622B, 624B, the 626B.

The switches 622A and 624A may comprise semiconductor switches as illustrated in FIG. 3A, 3B, 3C, or 3D.

The switch 626A in the upper arm 618A of the phase leg 608 comprises a plurality of SMs comprising SM1-A and SM2-A.

Each of the 2-level submodules SM1-A and SM2-A is a submodule 200 illustrated in FIG. 2.

Similarly, the switch 626B in the lower arm 618B of the phase leg 608 comprises a plurality of SMs comprising SM1-B and SM2-B.

The remaining phase legs 610 and 612 are symmetrical to the phase leg 608 and comprise a same arrangement as the phase leg 608.

For purposes of modularity uniformity, SMs within arrangements, such as SM1-A and SM2-A within the plurality of SMs 626A, are typically substantially equal values. However, certain embodiments may necessitate that SM1-A and SM2-A, or other SMs within similar arrangements, be of unequal (e.g., mixed) values.

The submodules SMs isolate the DC side comprising the DC terminals 606 from the AC side 616 when a fault is detected on the DC side or on the AC side.

FIG. 6B illustrates a second embodiment of the HMMC ANPC 600.

The second embodiment of the HMMC ANPC 600 differs from the first embodiment of the HMMC ANPC 600 in that the switches 626A and 626B may comprise semiconductor switches as illustrated in FIG. 3A, 3B, 3C, or 3D and the switch 624A in the upper arm 618A of the phase leg 608 is replaced with a plurality of SMs comprising the SM1-A and the SM2-A. Similarly, the lower arm 618B replaces the switch 624B with a plurality of SMs comprising the SM1-B and the SM2-B.

The remaining phase legs 610 and 612 are symmetrical to the phase leg 608 and reflect a corresponding replacement of individual switches with submodules.

FIG. 6C illustrates a third embodiment of the HMMC ANPC 600.

The third embodiment of the HMMC ANPC 600 differs from the first embodiment of the HMMC ANPC 600 in that the switches 626A and 626B may comprise semiconductor switches as illustrated in FIG. 3A, 3B, 3C or 3D and the switch 622A in the upper arm 618A of the phase leg 608 is replaced with a plurality of SMs comprising the SM1-A and the SM2-A. Similarly, the lower arm 618B replaces the switch 622B with a plurality of SMs comprising the SM1-B and the SM2-B.

The remaining phase legs 610 and 612 are symmetrical to the phase leg 608 and reflect a corresponding replacement of individual switches with submodules.

Figure 7A:
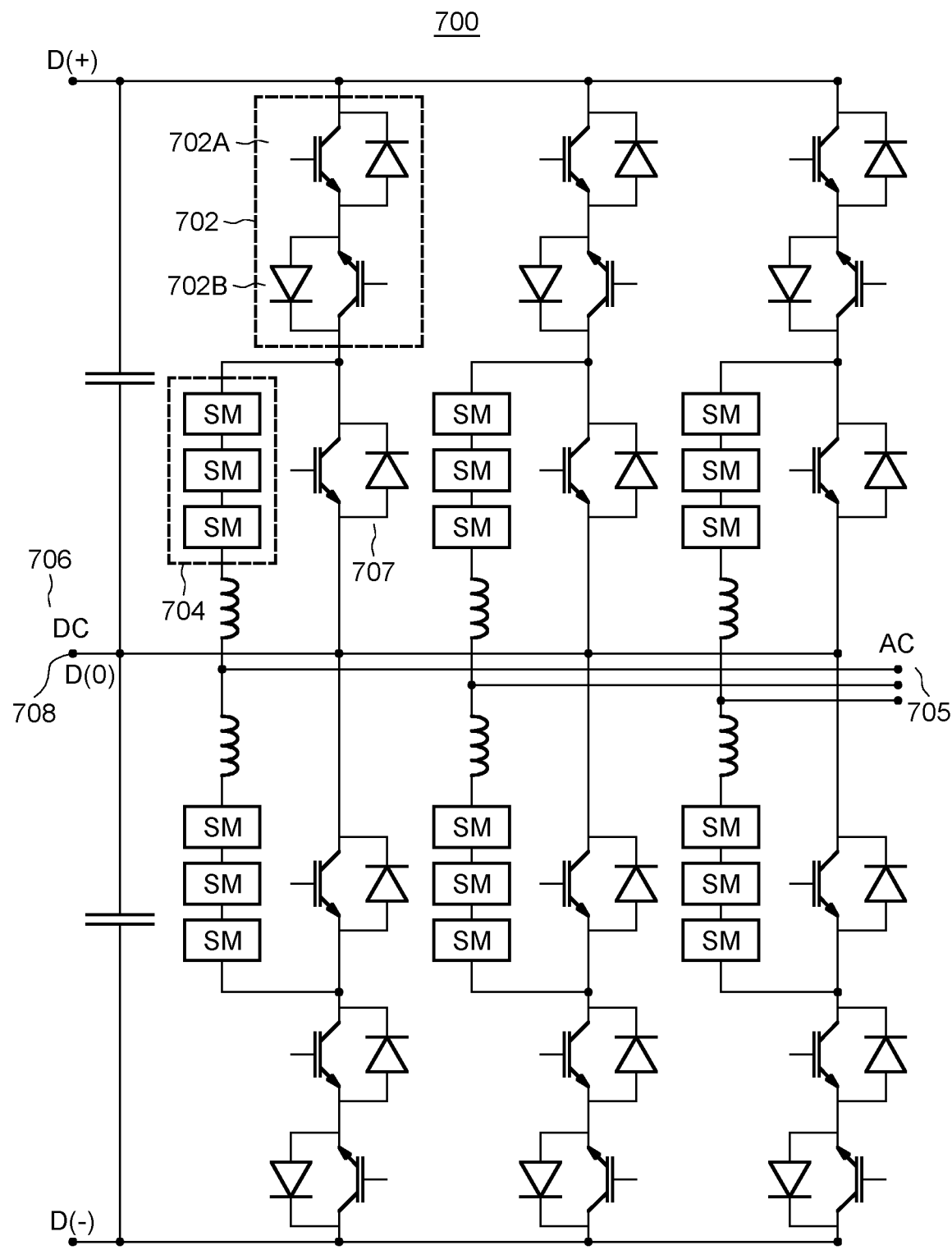
FIG. 7A illustrates a block diagram of a 3-level ANPC based HMMC using opposite polarity anti-blocking switches, in accordance with the embodiments.

FIG. 7A illustrates a block diagram of yet another embodiment of the present disclosure. In FIG. 7A, a 3-level ANPC HMMC 700 replaces a single switch, such as one of the switches 622A, 624A and 626A of FIG. 6A, with two anti-blocking switches connected in series and of opposite polarity. For example, the ANPC HMMC 700 includes an anti-blocking pair 702 of switches 702A and 702B that are of opposite polarity, connected in series, the switch 624A is replaced by a switch 704, and the switch 626A is replaced by a switch 707. The switch 704 may comprise semiconductor switches as illustrated in FIG. 3A, 3B, 3C, or 3D. The switch 704 comprises a plurality of SMs including SMs 200 illustrated in FIG. 2. The switch of 707 may comprise a plurality of semiconductor switches as illustrated in FIG. 3A, 3B, 3C, or 3D.

An advantage of this configuration is that the switches 702A and 702B, being of opposite polarity, provide short circuit isolation protection by blocking higher voltages from AC side 705 from feeding-back to the DC link on DC side 706. By way of example, the HMMC 700 includes a semiconductor module 707 (in each phase arm) for connecting to neutral point 708. In FIG. 7A, the semiconductor module 707 is an IGBT performing as an active switch, actively connecting to the neutral point 708, as needed.

Figure 7B:
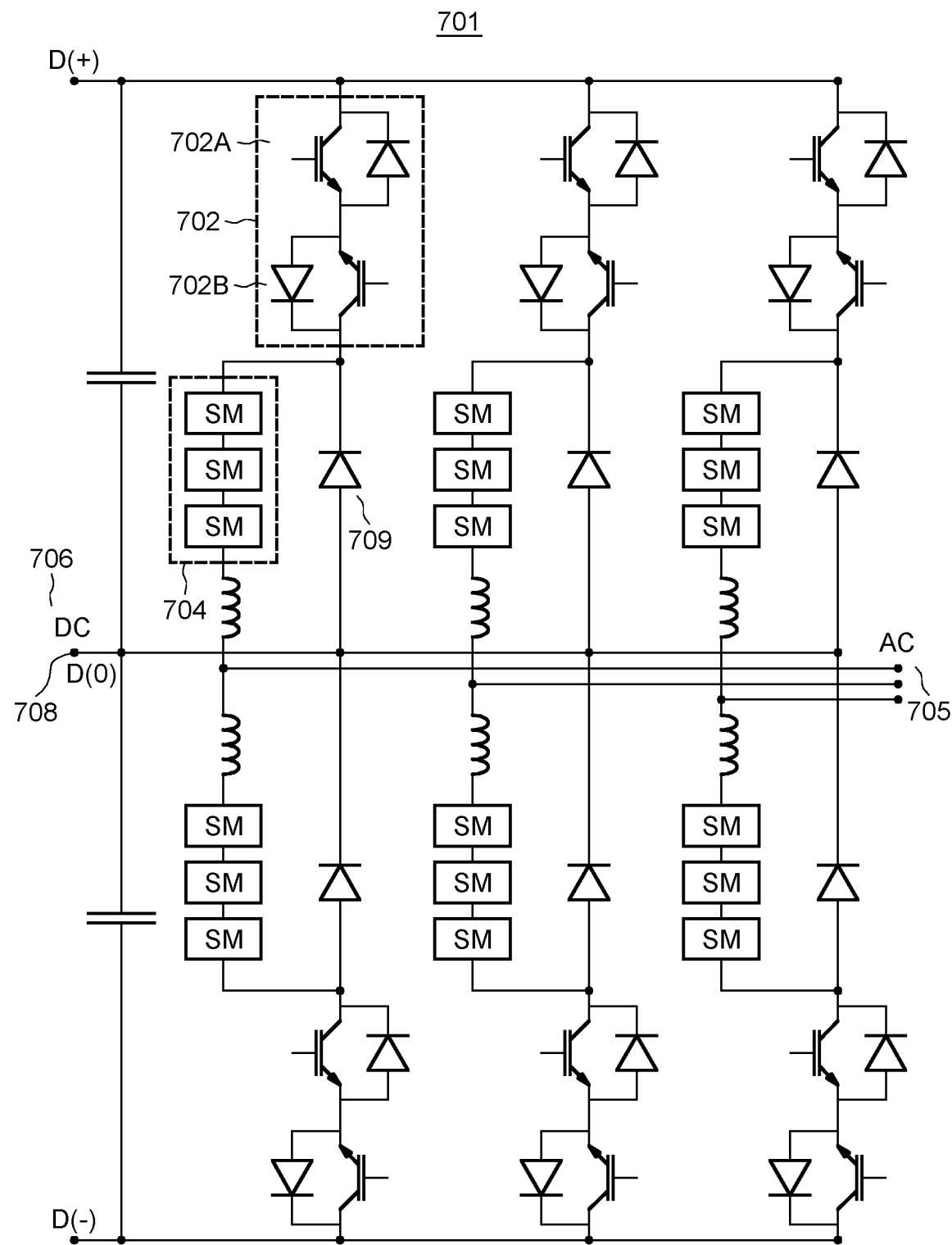
FIG. 7B illustrates a block diagram of a 3-level NPC based HMMC using opposite polarity anti-blocking switches, in accordance with the embodiments.

FIG. 7B illustrates a block diagram of a 3-level NPC based HMMC 701 using opposite polarity anti-blocking switches, in accordance with the embodiments. The HMMC 701 differs from the HMMC 700 of FIG. 7A by using a passive diode 709 (in each phase arm) as the semiconductor module for connecting to the neutral point 708.

Figure 7C:
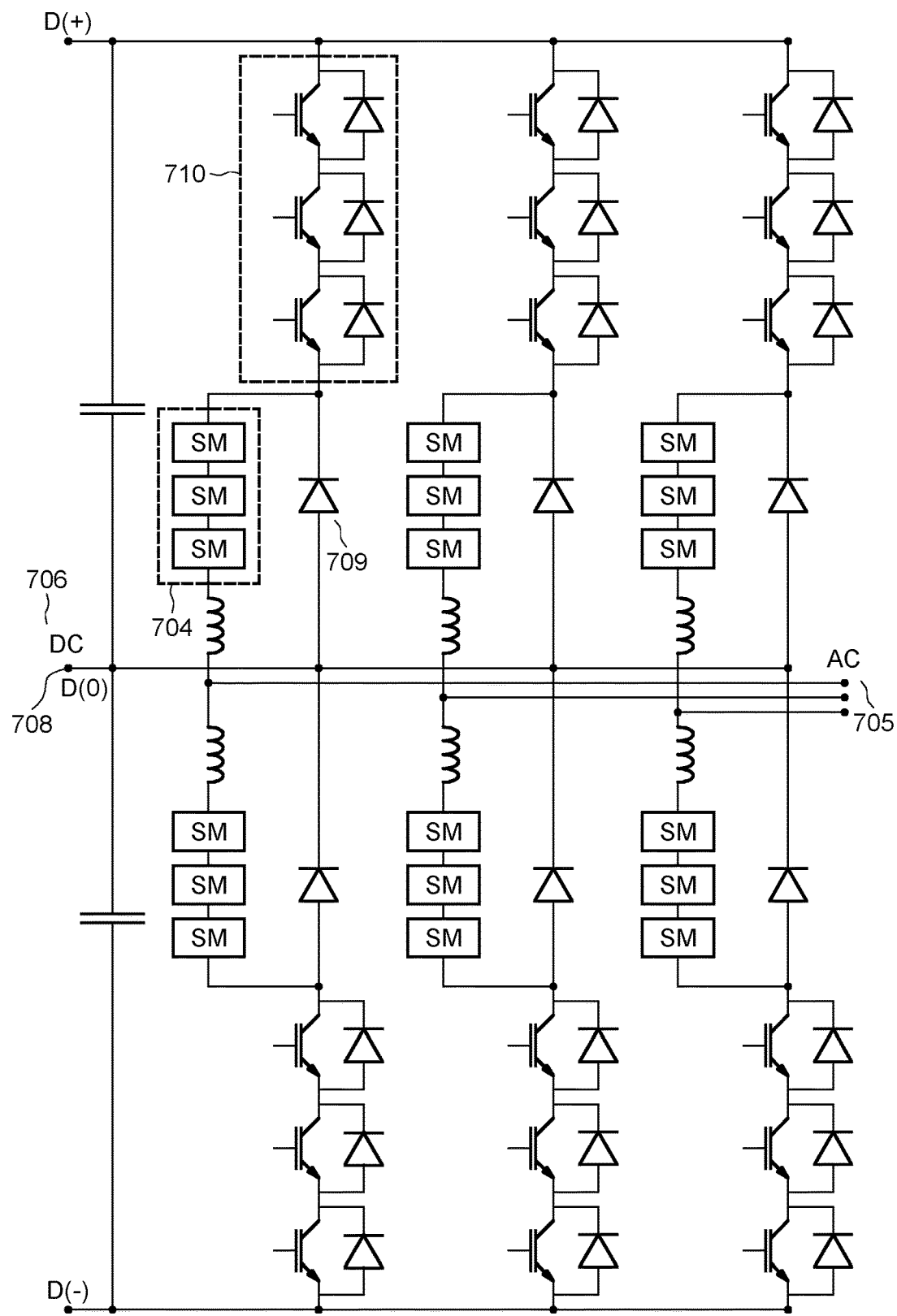
FIG. 7C illustrates a block diagram of a 3-level NPC based HMMC in accordance with the embodiments.

FIG. 7C illustrates a block diagram of a 3-level NPC based HMMC 703 including switches 710 (in each phase arm) implemented as IGBT, SCR or diode switches in series and having the same polarity.

The submodules SMs isolate the DC side 706 from the AC side 705 when a fault is detected on the DC side or on the AC side.

Figure 8A:
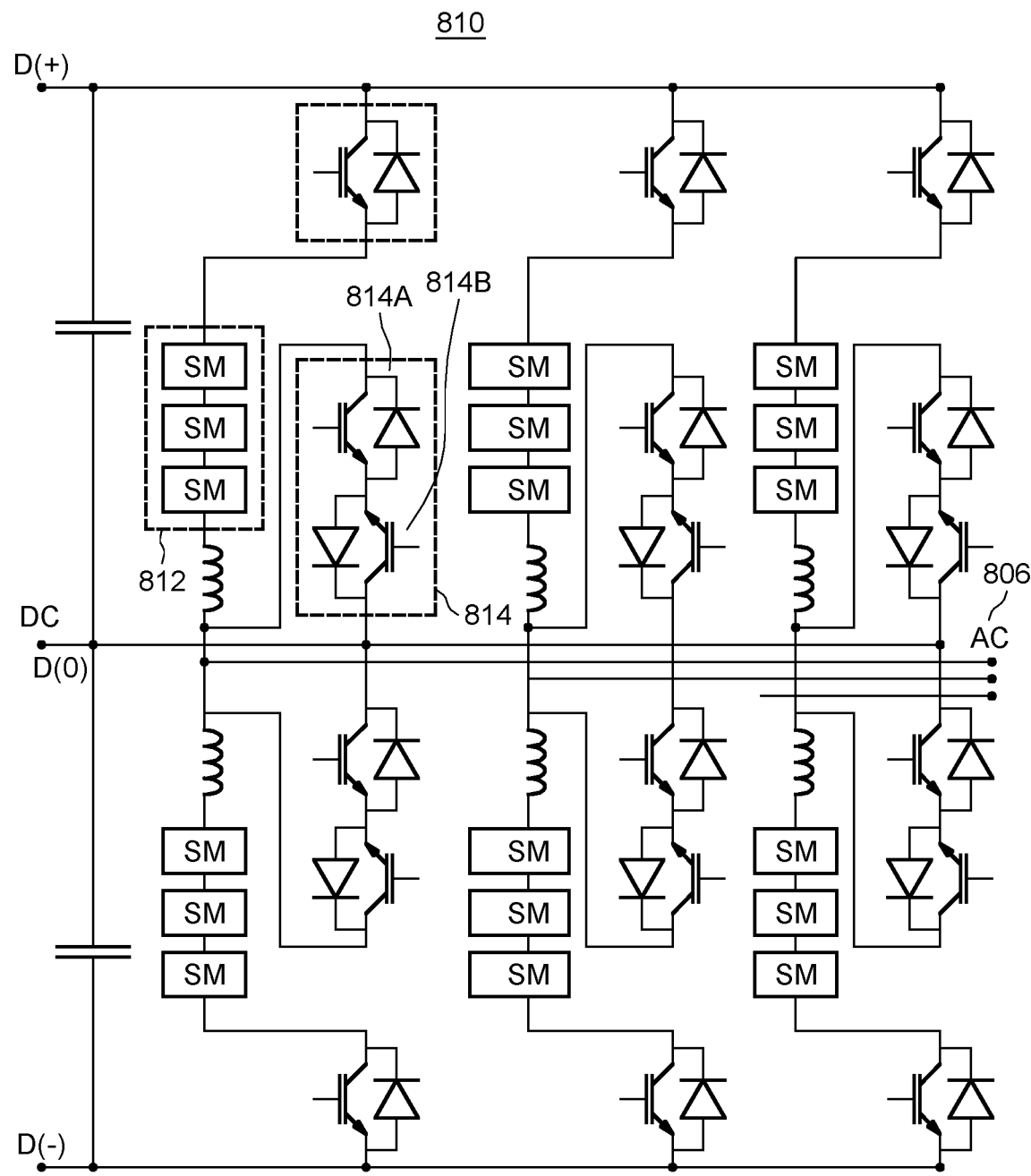
FIG. 8A illustrates a block diagram of a 3-level NPP based HMMC, in accordance with the embodiments.

By way of introduction and focus on NPP concepts, FIG. 8A illustrates a block diagram of a further embodiment of the present disclosure. The embodiment of FIG. 8A, using an NPP HMMC 810, provides similar isolation functionality to the ANPC HMMC 700 of FIG. 7A. For example, the NPP HMMC 810 includes an anti-blocking pair 814 of switches 814A and 814B that are of opposite polarity and are connected in series, in accordance with the embodiments. As achieved in the ANPC converter 700 of FIG. 7A, the NPP HMMC 810 is also configured to block higher voltages from AC side 806 from feeding-back to the DC link neutral point. The switch 812 comprises a plurality of SMs including SMs 200 illustrated in FIG. 2.

Figure 8B:
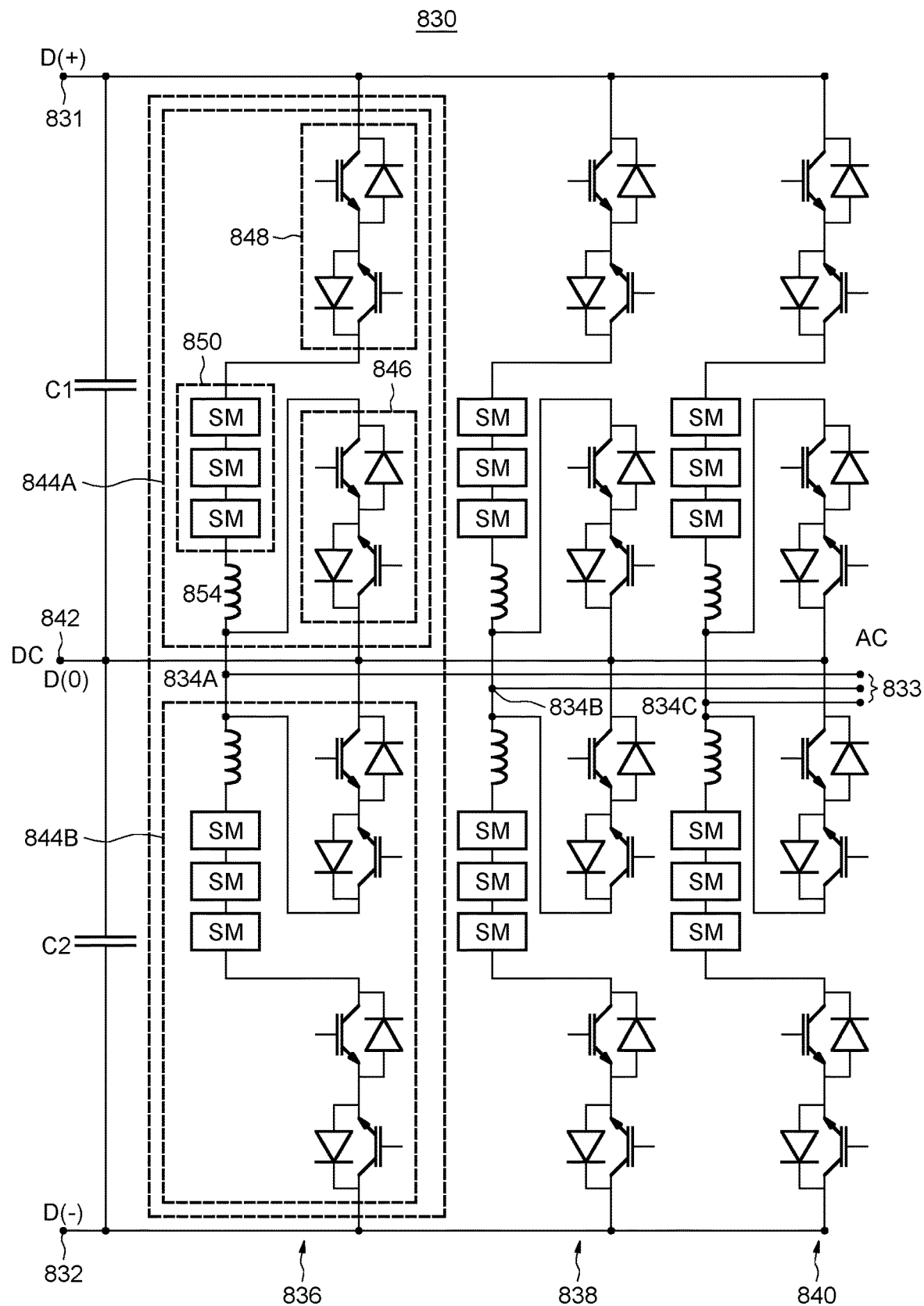
FIG. 8B illustrates a block diagram of a 3-level NPP based HMMC using anti-blocking switches in each phase arm branch, in accordance with the embodiments

FIG. 8B illustrates a detailed block diagram of a 3-level NPP HMMC 830 that shares similarities with the NPP converter 810 of FIG. 8A. However, as described in greater detail below, the NPP HMMC 830 provides an anti-blocking pair of switches on both branches of the phase arm. Therefore, by using anti-blocking switches, the NPP HMMC 830 also provides blocking of a short circuit of the DC link.

For purposes of convenience only, and not limitation, anti-blocking switches were only illustrated in FIGS. 7A-7B, and 8A-8B. However, it is noted that the concept of using anti-blocking switches to prevent higher voltages from the AC side from feeding-back to the DC link applies equally to the exemplary embodiments of FIGS. 6A-6C.

The exemplary HMMC 830 of FIG. 8B includes positive 831 and negative 832 DC voltage rails. An AC side 833 includes AC output terminals 834A, 834B, and 834C that correspond to AC phases A, B, and C, respectively. AC phase legs 836, 838, and 840 also respectively correspond to the AC phases A, B, and C and are electrically coupled to a neutral point 842. Although the ABC structure of the HMMC 830 shows three AC phases, the embodiments may apply to systems including (N) AC phases.

The phase legs 836, 838, and 840 are connected between the positive and negative rails 831 and 832. Each of the phase legs 836, 838, and 840 includes an upper arm and a lower arm. For example, the phase leg 836 includes an upper arm 844A and a lower arm 844B. Although the discussion below focuses on the upper arm 844A, the concepts discussed apply equally to the lower arm 844B, as well as the upper and lower arms of the phase legs 838 and 840.

The HMMC 830 includes DC link capacitors C1 and C2. Leads of each of the capacitors C1 and C2 are connected together and to the neutral point 842. Opposite leads of the capacitors C1 and C2 are connected to the positive and negative rails 831 and 832, respectively.

As depicted in FIG. 8B, the upper arm 844A includes a first pair of semiconductor switches 846 that are cascaded and connected series, preferably of opposite polarity. One lead of the switch pair 846 is coupled the AC voltage terminal 834A and the other lead is connected to the neutral point 842. The upper arm 844A also includes a second pair of semiconductor switches 848 depicted with opposite polarities. Although the semiconductor switches 848 are shown with opposite polarity, the embodiments are not so limited. An open lead of the switch pair 848 is coupled to the positive rail 831.

The upper arm 844A also includes a plurality of series connected SMs 850, thus introducing the hybrid approach of mixing of SMs and semiconductor switches within the upper and lower arms of an HMMC phase leg. The SMs 850 includes SMs 200 illustrated in FIG. 2. One lead of the series connected SMs 850 is coupled to a lead of the switch pair 848, with the other lead being coupled to an arm inductor 854. The other lead of the arm inductor 854 is coupled to the AC terminal 834A.

The disclosed NPP HMMC converters comprising submodules with built-in galvanic isolation using dual active bridge converters 209 has a higher power density and is more compact than as a system including a stand-alone transformer and an HMMC converter known from the prior art.

Further, the built-in galvanic isolation provides additional capability for fault-handling and protection which may be required for certain applications, such as military/Navy applications. The submodules SMs isolate the DC side from the AC side when a fault is detected on the DC side or on the AC side.

The various embodiments of the disclosure enable truly variable DC link voltage levels, especially levels lower than voltages on the AC side.

The various embodiments of HMMC of the disclosure are well suited for applications that require the DC link voltage being variable and lower than the AC input voltage, for example the case of an active front end (AFE) converter interfacing with an AC motor drive/inverter.

The peak or maximum phase to neutral voltage values at each AC terminal may be lower or higher than DC link voltage values.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

The invention claimed is:

1. Modular multilevel converter (MMC) having an ABC N-phase structure, comprising N pairs of identical upper and lower arms, each upper and lower arm being composed of X submodules, X being an integer, wherein each submodule comprises a first half bridge converter, a second half bridge converter, and a dual active bridge converter including a first connection, a second connection, a third connection and a fourth connection, wherein the first half bridge converter is interconnected with the first and second connections via a first capacitor included in the first half bridge and the second half bridge converter is interconnected with the third and fourth connections via a second capacitor included in the second half bridge.

2. The MMC according to claim 1, wherein each of the half bridge converter includes two semiconductor switches formed of Si IGBTs.

3. The MMC according to claim 1, wherein each of the half bridge converter includes two semiconductor switches formed with SiC MOSFET and/or GaN MOSFET.

4. The MMC according to claim 1, wherein the dual active bridge converter includes semiconductor switches formed with SiC MOSFET or GaN MOSFET.

5. Hybrid modular multilevel converter (HMMC) based on a neutral point clamped topology (NPC) or an active neutral point clamped topology (ANPC), and having an ABC N-phase structure, comprising N pairs of identical upper and lower arms, each upper and lower arm being composed of X submodules and Y sets of switches, X and Y being integers, wherein each submodule comprises a first half bridge converter, a second half bridge converter, and a dual active bridge converter including a first connection, a second connection, a third connection and a fourth connection, wherein the first half bridge converter is interconnected with the first and second connections via a first capacitor included in the first half bridge and the second half bridge converter is interconnected with the third and fourth connections via a second capacitor included in the second half bridge.

6. The HMMC according to claim 5, wherein each of the half bridge converter includes two semiconductor switches formed of Si IGBTs.

7. The HMMC according to claim 5, wherein each of the half bridge converter includes two semiconductor switches formed with SiC MOSFET and/or GaN MOSFET.

8. The HMMC according to claim 5, wherein the dual active bridge converter includes semiconductor switches formed with SiC MOSFET or GaN MOSFET.

9. The HMMC of claim 5, wherein the switches within each set are cascaded and connected in series.

10. The HMMC of claim 5, wherein the switches within each of the Y set of switches is formed of IGBTs.

11. The HMMC of claim 5, wherein the switches within each of the Y set of switches is formed of diodes.

12. The HMMC of claim 5, wherein the switches within each of the Y set of switches is formed of SCRs.

13. The HMMC of claim 5, wherein at least one of the set of semiconductor switches is formed of IGBTs of opposite polarities.

14. The HMMC of claim 13, wherein the switches within each of the Y set of switches is formed of IGBTs of opposite polarities.

15. Hybrid modular multilevel converter (HMMC) based on a neutral point pilot topology (NPP) and having an ABC N-phase structure, comprising N pairs of identical upper and lower arms, each upper and lower arm being composed of X submodules and Y sets of switches, X and Y being integers, wherein each submodule comprises a first half bridge converter, a second half bridge converter, and a dual active bridge converter including a first connection, a second connection, a third connection and a fourth connection, wherein the first half bridge converter is interconnected with the first and second connections via a first capacitor included in the first half bridge and the second half bridge converter is interconnected with the third and fourth connections via a second capacitor included in the second half bridge.

16. The HMMC according to claim 15, wherein each of the half bridge converter includes two semiconductor switches formed of Si IGBTs.

17. The HMMC of claim 16, wherein at least one of the set of switches is formed of IGBTs of opposite polarities.

18. The HMMC of claim 16, wherein the switches within each of the Y set of switches is formed of IGBTs of opposite polarities.

19. The HMMC according to claim 15, wherein each of the half bridge converter includes two semiconductor switches formed with SiC MOSFET and/or GaN MOSFET.

20. The HMMC according to claim 15, wherein the dual active bridge converter includes semiconductor switches formed with SiC MOSFET or GaN MOSFET.

21. The HMMC of claim 15, wherein the semiconductor switches within each set are cascaded and connected in series.

22. The HMMC of claim 15, wherein the switches within each of the Y set of switches is formed of IGBTs.

23. The HMMC of claim 15, wherein the switches within each of the Y set of switches is formed of diodes.

24. The HMMC of claim 15, wherein the switches within each of the Y set of switches is formed of SCRs.

* * * * *